United States Patent
Tabanelli et al.

(10) Patent No.: US 12,005,600 B2
(45) Date of Patent: Jun. 11, 2024

(54) METHOD AND APPARATUS FOR CUTTING A PIPE MADE FROM THERMOPLASTIC MATERIAL

(71) Applicant: SICA S.p.A., Alfonsine (IT)

(72) Inventors: Giorgio Tabanelli, Cotignola (IT); Lorenzo Spagna, Guastalla (IT); Marco Gulminelli, Ravenna (IT)

(73) Assignee: SICA S.P.A., Alfonsine (IT)

(*) Notice: Subject to any disclaimer, the term of this patent is extended or adjusted under 35 U.S.C. 154(b) by 0 days.

(21) Appl. No.: 17/195,564

(22) Filed: Mar. 8, 2021

(65) Prior Publication Data

US 2021/0187771 A1    Jun. 24, 2021

Related U.S. Application Data

(62) Division of application No. 16/332,653, filed as application No. PCT/IB2017/056079 on Oct. 3, 2017, now Pat. No. 10,974,408.

(30) Foreign Application Priority Data

Oct. 17, 2016  (IT) .................. 102016000104006

(51) Int. Cl.
| | | |
|---|---|---|
| *B26D 3/16* | (2006.01) | |
| *B26D 7/10* | (2006.01) | |
| *B29C 48/00* | (2019.01) | |
| *B29C 48/09* | (2019.01) | |
| *B29K 101/12* | (2006.01) | |
| *B29L 23/00* | (2006.01) | |

(52) U.S. Cl.
CPC .............. *B26D 3/16* (2013.01); *B26D 7/10* (2013.01); *B29C 48/0022* (2019.02); *B29C 48/09* (2019.02); *B29K 2101/12* (2013.01); *B29L 2023/22* (2013.01)

(58) Field of Classification Search
CPC .... B26D 3/16; B26D 7/10; B26D 7/08; Y10T 83/0414; Y10T 83/283; Y10T 83/263
USPC ......................................................... 83/170
See application file for complete search history.

(56) References Cited

U.S. PATENT DOCUMENTS

| | | | | |
|---|---|---|---|---|
| 1,765,814 A | * | 6/1930 | Wright .................. | C03B 33/09 225/93.5 |
| 2,334,577 A | | 11/1943 | Postlewaite | |
| 2,417,412 A | * | 3/1947 | Herbst .................. | B23K 7/006 83/318 |
| 2,521,352 A | * | 9/1950 | Dockerty .............. | C03B 33/095 225/93.5 |
| 2,630,519 A | * | 3/1953 | Gard ...................... | H05B 6/78 83/16 |
| 2,930,269 A | | 3/1960 | Kennedy | |
| 3,141,367 A | * | 7/1964 | Keener ................. | B23P 25/003 198/780 |
| 3,735,673 A | | 5/1973 | Sheehan et al. | |
| 3,877,625 A | | 4/1975 | Brock | |
| 4,343,209 A | | 8/1982 | Moelbert | |
| 4,413,406 A | | 11/1983 | Bennett et al. | |
| 4,537,102 A | | 8/1985 | Balzer | |
| 5,224,638 A | | 7/1993 | Nolan et al. | |
| 5,383,381 A | * | 1/1995 | Graham ............... | B23D 21/003 83/699.41 |
| 9,283,689 B2 | * | 3/2016 | Tabanelli ............. | B26D 3/16 |

FOREIGN PATENT DOCUMENTS

| | | |
|---|---|---|
| CN | 1765561 A | 5/2006 |
| CN | 103042549 A | 4/2013 |
| CN | 103158169 A | 6/2013 |
| CN | 104203510 A | 12/2014 |
| CN | 104203539 A | 12/2014 |
| CN | 204657615 U | 9/2015 |
| DE | 2025702 A1 | 12/1971 |
| DE | 2618877 A1 | 11/1977 |
| JP | S63295137 A | 12/1988 |
| WO | 2013140208 A1 | 9/2013 |
| WO | 2013183025 A1 | 12/2013 |

OTHER PUBLICATIONS

Chinese Office Action dated Apr. 16, 2020 from related Chinese Patent Application No. 201780058651.8.
International Search Report and Written Opinion dated Jan. 19, 2018 from related International Patent Application No. PCT/IB2017/056079.
Italian Search Report dated Mar. 29, 2017 from related Italian Patent Application No. IT 10201600104006.
Chinese Office Action dated Jan. 29, 2021 from counterpart Chinese Patent Applcation No. 201780058651.8.
Indian Office Action dated Jan. 7, 2021 from counterpart Indian Patent Application No. 201927009157.

* cited by examiner

*Primary Examiner* — Laura M Lee
(74) *Attorney, Agent, or Firm* — SHUTTLEWORTH & INGERSOLL, PLC; Timothy J. Klima

(57) ABSTRACT

A method for cutting a pipe made of thermoplastic material including, in combination, the following steps: feeding a continuous pipe made of thermoplastic material; localised and circumferential heating of a first localised axial portion of the pipe for a predetermined time using a heating unit; cutting without removal of chippings, using a cutting unit, of the first heated axial portion, to obtain a piece of the pipe; localised and circumferential heating of a second localised axial portion of the pipe, for a predetermined time, the second axial portion being placed at a predetermined distance from the first portion.

11 Claims, 4 Drawing Sheets

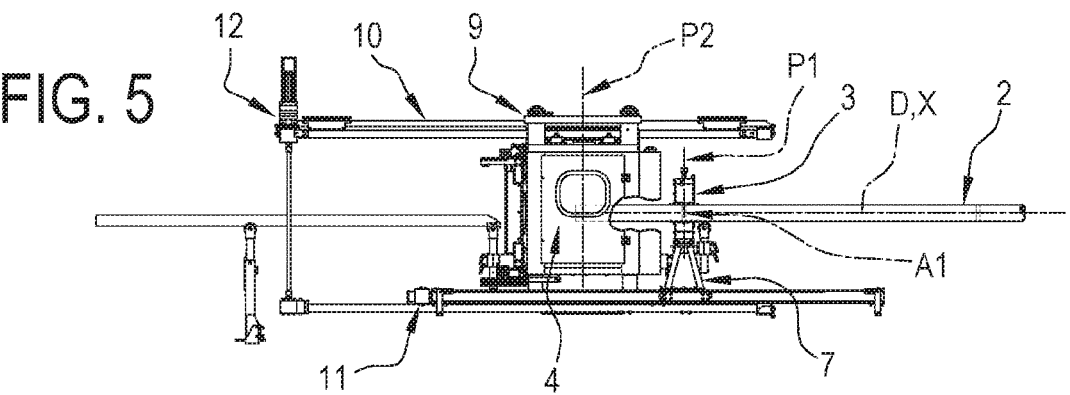
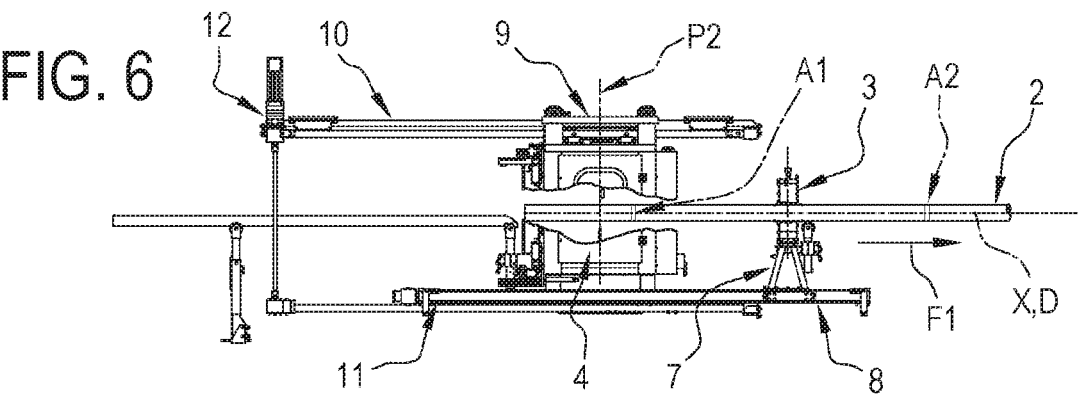
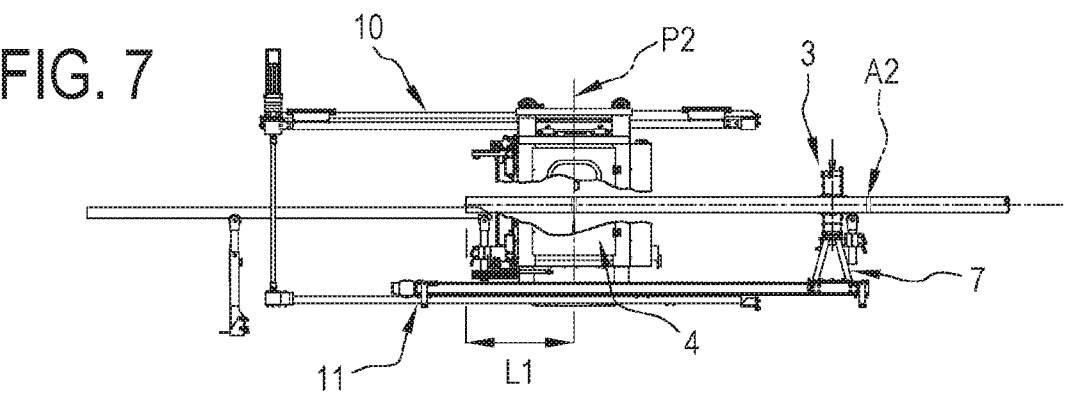
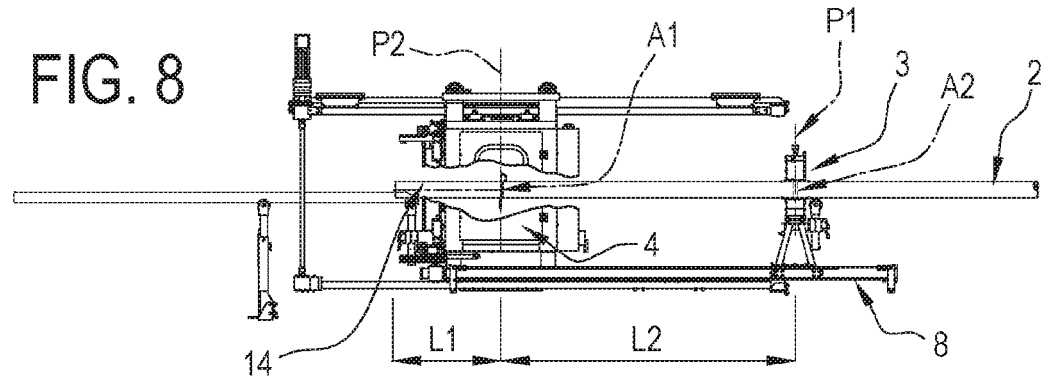

METHOD AND APPARATUS FOR CUTTING A PIPE MADE FROM THERMOPLASTIC MATERIAL

This application is a divisional of U.S. patent application Ser. No. 16/332,653 filed Mar. 12, 2019 which is a National Phase of International Application PCT/IB2017/056079 filed Oct. 3, 2017 which designated the U.S.

This application claims priority to Italian Patent Application No. 102016000104006 filed Oct. 17, 2016, which application is incorporated by reference herein.

TECHNICAL FIELD

This invention relates to a method and an apparatus for processing a pipe made from thermoplastic material, more specifically a method and an apparatus for cutting a pipe made from thermoplastic material.

BACKGROUND ART

Pipes made from thermoplastic material are used, for example, as rigid pipes for sanitary purposes, for outdoor rainwater pipes, for water distribution and drains.

Pipes made from thermoplastic material are produced by an extrusion process, in a plant which pushes the material in the plastic state, using a screw that rotates inside a cylinder, through a mould of suitable shape and dimensions.

The pipe production plant, known as the extrusion line, comprises a plurality of apparatuses, each designed for a specific function and, amongst these, generally located at the end of the line, an apparatus known as the "cutter", designed for cutting the pipe into pieces of pipe of precise and predetermined length.

This apparatus comprises a cutting unit installed on a movable carriage synchronized with the pipe and equipped with clamping means, designed for coupling with the pipe during the cutting operation.

With reference to the motion of the processing tool relative to the axis of the pipe, there are two different types of cutter apparatus: the shearing cutter apparatus and the planetary cutter apparatus.

The shearing cutter machines are characterised by a working motion of the cutting tool with direction of movement perpendicular to the axis of the pipe, whilst the planetary cutters are characterised by a working motion of the cutting tool with a circular movement relative to the axis of the pipe.

With reference to the cut, there are cutting techniques without removal of material and cutting techniques with removal of material.

The cutting techniques without removal of material are mainly used only for materials which are tough and with limited hardness, that is, materials characterised by high resistance to dynamic stresses and poor resistance to penetration of cutting tools, such as, for example PE, PP and PB thermoplastics.

More specifically, these materials can be cut with cutting tools designed as blades with one or more cutting edges or with circular disk blades rotating freely about a respective axis or with guillotine blades.

It should be noted that these cutting techniques can be used with pipes having relatively small wall thicknesses; on the other hand, with pipes having particularly large wall thicknesses, the same cutting techniques are difficult to carry out because the cutting tool (generally in the shape of a circular disk) is subject to high levels of stress which favour deformation.

For materials with a particularly high hardness and a fragile-type mechanical behaviour the above-mentioned cutting techniques without removal of material are not practicable as they could easily cause failure of the pipe during cutting (with possible damaging of the tool) and, in any case, the cut would be imprecise; in that case, the pipe is normally cut using cutting techniques with removal of material.

The cutting apparatus for these techniques comprises metal circular saws which are multi-serrated or have a surface coating of abrasive material.

It should be noted that the cutting by removing material generates large quantities of chippings which must be immediately removed from the cutting area to avoid malfunctioning of the cutting machine and/or other apparatuses located nearby.

Moreover, the cuttings produced are harmful for the user and can electrostatically charge and adhere to the walls of the pipe making the subsequent processing of the pipe difficult.

It should also be noted that cutting techniques with removal of material also generate harmful vibrations which are transmitted to the machine components.

In light of the above, the need was felt to provide a method and an apparatus capable of cutting without removal of material even pipes with particularly large wall thicknesses and/or pipes of particular high hardness and fragile mechanical behaviour.

Patent document WO 2013/140208, in the name of the same applicant as this invention, provides a method and a relative apparatus for cutting the end of pipes made of thermoplastic material which is able to overcome the above-mentioned drawbacks with reference to the prior art and respond to the need felt in the trade.

The method mentioned above comprises, before cutting the pipe, a prior localised heating of the pipe itself at the zone to be cut.

The method adopted teaches to place in succession, on a carriage movable in the feed direction of the pipe, a heating unit and, downstream thereof, a cutting unit.

The solution just described, even though absolutely effective in terms of cutting the pipe, has not been seen to be entirely satisfactory relative to the production capacity of the line in which is integrated, as well as with reference to the overall dimensions of the relative apparatus.

Further, the prior art cutting solutions have not always been found to be satisfactory in terms of versatility of use.

DISCLOSURE OF THE INVENTION

The aim of this invention is therefore to meet the above-mentioned needs by providing a method and an apparatus for cutting a pipe which are effective and have high levels of performance.

A further aim of the invention is to allow the cutting of pipes made from thermoplastic material of any length, thickness and dimension obtaining a high quality of finished product.

Another aim of the invention is to provide an apparatus for cutting pipes made from thermoplastic material of limited overall size.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred, non-limiting embodiment of the invention by way of example and in which:

FIGS. 1 to 10 schematically illustrate respective operating steps of the method according to this invention, actuated using a relative apparatus;

DETAILED DESCRIPTION OF PREFERRED EMBODIMENTS OF THE INVENTION

With reference to the accompanying drawings, the numeral 1 denotes a preferred embodiment of an apparatus for cutting pipes 2 made of thermoplastic material according to the invention.

The expression "pipes made from thermoplastic material" is used to mean any pipe made from thermoplastic material, for example pipes made from PVC-U, PMMA, ABS (amorphous thermoplastics), PE, PP and PB (semi-crystalline thermoplastics) etc.

The apparatus 1 is advantageously inserted in a line for the production of pieces of pipe made of thermoplastic material comprising, upstream of the apparatus 1, a plurality of apparatuses designed to feed to the apparatus 1 a continuous a pipe 2 made from thermoplastic material according to a predetermined substantially rectilinear direction D.

With reference to the accompanying drawings, the pipe 2 has a central axis X parallel to the direction D.

Figure 11:
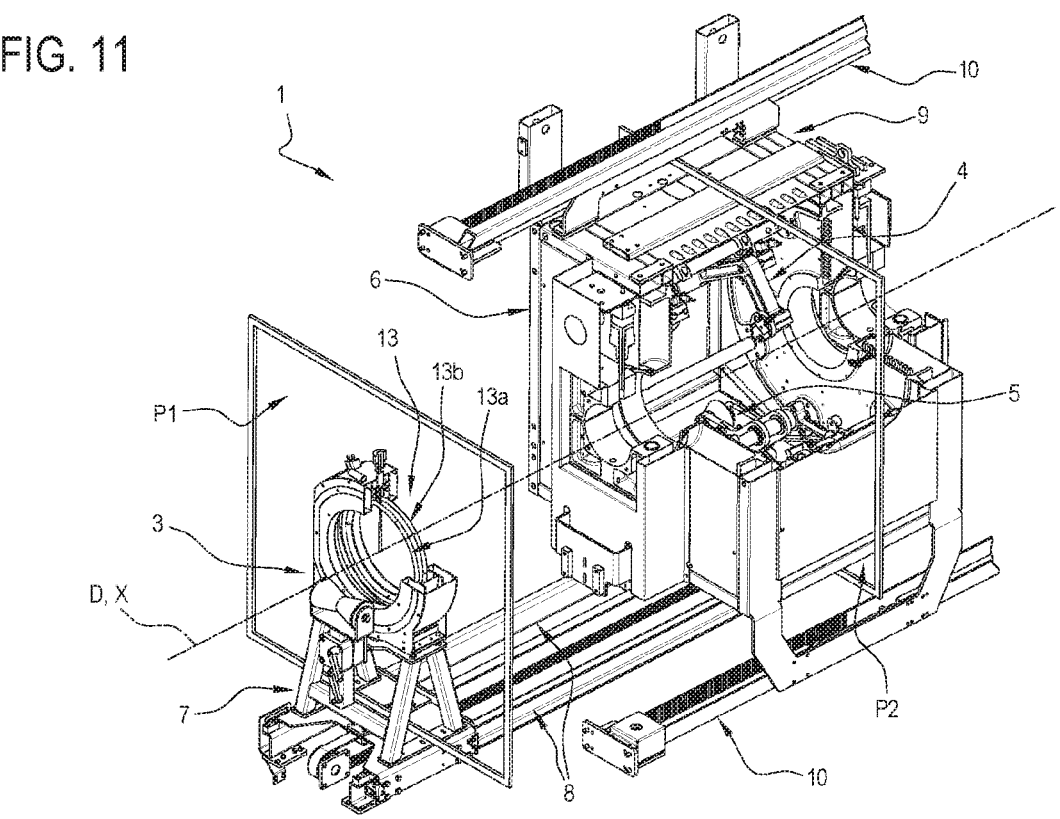
FIG. 11 is a schematic perspective view, with some parts in cross-section and others cut away, of a preferred embodiment of the apparatus according to the invention.

As illustrated in FIG. 11, the apparatus 1 for cutting pipes comprises a heating unit 3 and a unit 4 for cutting the pipe.

The preferred embodiment of the apparatus 1 illustrated in FIG. 11 also advantageously comprises a unit 5 for chamfering the edge of the pipe 2 cut by the cutting unit 4. The unit 5 advantageously performs the chamfering of the end of the pipe 2 by plastic deformation.

The cutting unit 4 and chamfering unit 5 are advantageously housed inside a cabin 6.

This specification describes only the cutting operation; the chamfering operation being in fact optional for the purposes of this invention.

As illustrated in FIG. 11, the heating unit 3, of substantially known type, is mounted on a respective first carriage 7.

The first carriage 7 is slidably engaged on respective first tracks 8.

The cutting unit 4, together with the respective cabin 6 which contains it, is supported by a second carriage 9.

The second carriage 9 is slidably engaged on respective second tracks 10.

The first tracks 8 and the second tracks 10 extend longitudinally to each other parallel to above-mentioned predetermined direction D.

The first tracks 8 and the second tracks 10 are separate from each other.

With reference to FIG. 11, respective heating and cutting planes P1 and P2 are identified at each cutting unit 3 and heating unit 4.

The heating and cutting planes P1 and P2 are perpendicular to the predetermined direction D which defines, as mentioned above and as illustrated in FIGS. 1 to 10, the direction of extension and feeding of the pipe 2 made of plastic material fed to the apparatus 1.

FIGS. 1 to 10 show respective tracks of the heating and cutting planes P1, P2.

The apparatus 1 comprises first and second actuator means 11, 12 designed to move, respectively, the first and second carriages 7, 9 along the tracks 8, 10 according to the above-mentioned predetermined direction. Actuator means which can be of a hydraulic, pneumatic or electrical type.

Advantageously, the actuators means 11, 12 comprise respective electric motors of known type together with means, also of known type and not illustrated in detail, for transmitting the motion to the respective carriages 7, 9, such as toothed belts or the like.

The apparatus 1 also comprises, not illustrated, a unit for command and control of the motor means 11, 12, configured for moving independently the first and second carriages 7, 9 (and the respective heating unit 3 and cutting unit 4 supported by them) along the above-mentioned predetermined direction D, in a manner described in detail below.

The above-mentioned cutting unit 3 and heating unit 4 define, for the apparatus 1, respective means for heating and cutting the pipe 2 made of thermoplastic material.

The heating unit 3, illustrated schematically in the accompanying drawings, preferably comprises a device 13 for emitting electromagnetic waves, configured for emitting the waves circumferentially, in the direction of localised axial portions A1, A2 of the pipe 2.

More specifically, it should be noted that the expression "localised axial portion" (hereafter also referred to, without distinction, also as "axial portion") means a circumferential portion of pipe having a limited axial extension (preferably less than the diameter of the pipe).

In short, only the portion on which the cutting of the pipe will be subsequently carried out, by the cutting unit 4, is heated.

It should be noted that the heated axial portion A1, A2 has an axial extension as a function of a thickness (of wall) and/or of a diameter of the pipe 2.

More specifically, according to this aspect, the axial extension of the axial portion A1, A2 is proportional to the thickness of wall and/or diameter of the pipe 2.

In the embodiment of the heating unit 3 illustrated in the accompanying drawings and, in particular, in FIG. 11, the emission device 13 advantageously comprises a pair of tungsten filament loop-shaped radiation devices, which are individually labelled 13a and 13b.

The cutting unit 4, illustrated schematically in the accompanying drawings has, preferably, a knife tool.

Alternatively, the type of tool is a guillotine tool.

However, generally speaking, the tool is a cutting tool, configured for cutting the pipe 2 without removal of chippings, that is to say, merely separating the material, at the heated axial portion A1, A2.

Wither reference to the working motion of the knife tool, the cutting unit 4 is advantageously configured in such a way that the tool is movable with a direction of movement perpendicular (radially) to the axis of the pipe 2 and simultaneously in such a way that the tool has a circular movement relative to the axis X of the pipe 2.

In other words, the cutting tool has a combined movement of sinking in a radial direction (inside the thickness of the pipe) and rotation about the axis X of the pipe 2.

Preferably, the step for heating the pipe 2, required for the step for cutting the pipe, comprises a step of emitting electromagnetic waves in the direction of its two axial portions A1, A2.

Therefore, preferably, the axial portion A1, A2 of the pipe 2 is heated by electromagnetic waves incident on the outer surface of the portion A1, A2.

It should be noted that the electromagnetic waves propagate through the walls of the pipe 2, for heating in an extremely short time the entire portion A1, A2 of the pipe 2.

The step for heating of the pipe 2 is aimed at reaching a suitable thermal and rheological state of the thermoplastic material, which is optimum for cutting. The final thermal and rheological state are reached after a predetermined time in which a step of emitting electromagnetic waves is actuated.

During this step, of predetermined duration, sensor means of known type and not illustrated, measure the reaching of a limit operating temperature and determine, using suitable commands, the termination of the emission of electromagnetic waves upon reaching said temperature and the subsequent restarting of the emission if the temperature measured falls below the limit temperature.

Figure 1:
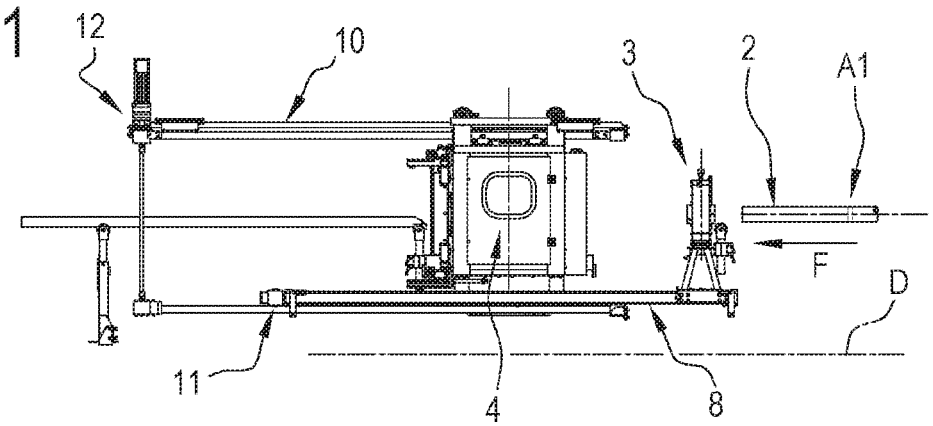

In use, as illustrated in FIG. 1, the heating unit 3 and the cutting unit 4 are waiting in the relative "0", or stroke start, positions whilst the pipe 2 being extruded advances at a constant speed along the predetermined direction D, in the direction of the arrow F.

Figure 2:
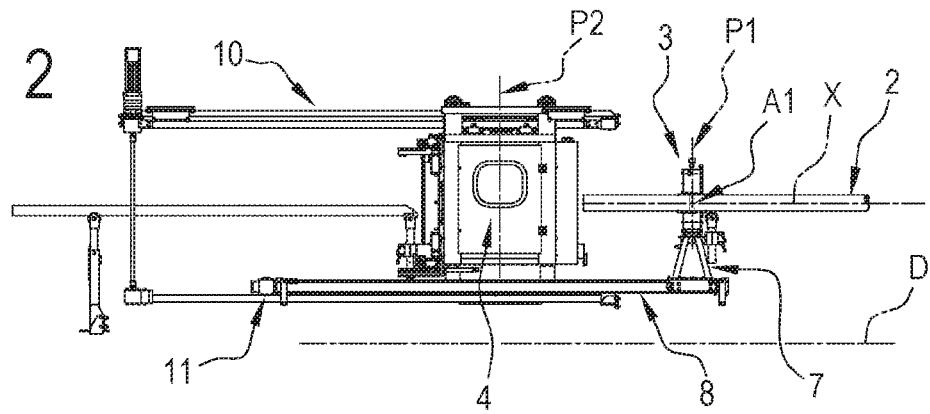

According to the operating configuration illustrated in FIG. 2, a first axial portion A1 of the pipe 2, at which the cut is to made, reaches the heating unit 3.

Consequently, the heating unit 3, by means of the respective, above-mentioned, first actuator means 11, accelerates its movement until synchronising with the first axial portion A1 and, moving as one with it, the heating starts.

It is evident that when speaking of movement of the heating unit 3 reference is made to the movement of the respective first carriage 7, with which the heating unit 3 is integral, along the respective first tracks 8, in the direction D.

Figure 3:
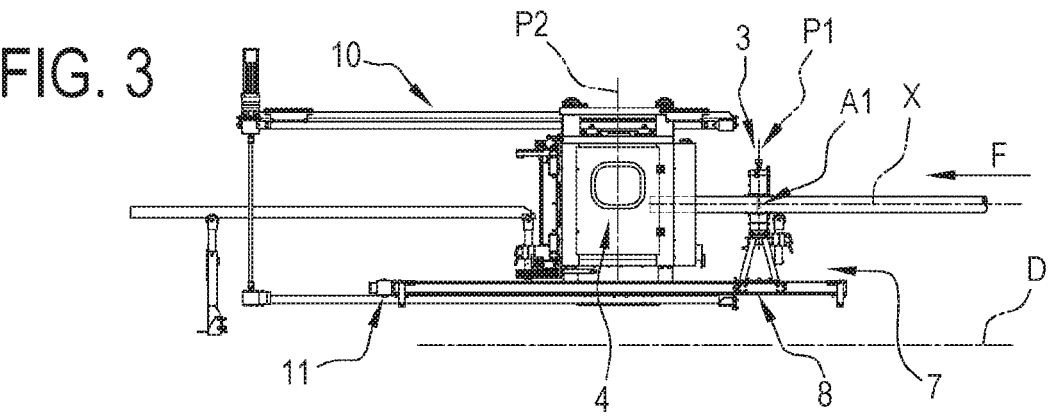

With reference to FIG. 3, the heating unit 3 continues in its motion integral with the pipe 2 along the direction D, according to the direction indicated by the arrow F, heating the above-mentioned first axial portion A1 which will be subsequently cut. The cutting unit 4 is stationary in its "0" position.

Figure 4:
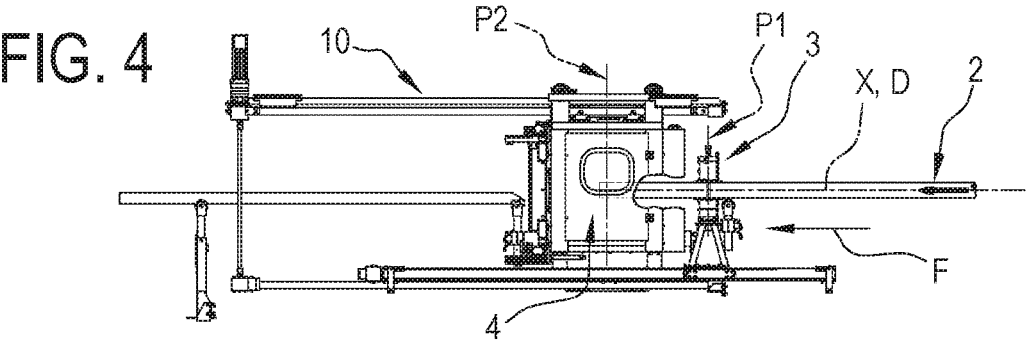

As illustrated in FIG. 4, the heating unit 3 reaches, whilst heating the pipe 2 at its first axial portion A1, the minimum permitted distance with the cutting unit 4 still substantially stationary.

With reference to FIG. 5, the reaching of the condition of minimum distance described above causes the cutting unit 4 to start and move also in a synchronised fashion with the pipe 2, advantageously maintaining the above-mentioned distance relative to the heating unit 3.

In a similar manner to that described above with reference to the heating unit 3, it is evident that when speaking of movement of the cutting unit 4 reference is made to the movement of the respective second carriage 9, to which the cutting unit 4 is integral, along the respective second tracks 10, in the direction D.

As illustrated in FIG. 6, when the predetermined time for the step of heating the first axial portion A1 is completed, the heating unit 3 reverses its motion (that is, always in the direction D but in the opposite direction, as indicated by the arrow F') and it seeks the new area to be heated on the pipe 2, that is, a second axial portion A2.

The spacing of the above-mentioned first and second axial portions A1, A2 is determined by the above-mentioned and not illustrated command and control unit which, as a function of the dimensional features relative to the pieces of pipe 2 required, governs the consequent movement of the first and second carriages 7, 9 which support the heating unit 3 and 4.

Again with reference to FIG. 6, the pipe 2 continues to feed at a constant speed and, simultaneously, the cutting unit 4 also reverses its motion (that is, always in the direction D but with the direction indicated by the arrow F') and it synchronises with the pipe 2 at the first axial portion A1 for which the heating has just finished.

As shown in FIG. 7, the cutting unit 4, positioned at the first heated axial portion A1, again reverses its motion and moves in synchrony with the pipe 2 in the direction of the arrow F. In this condition of synchronous movement of the pipe 2 and cutting unit 4, the latter performs the cutting of the pipe 2 at the first axial portion A1.

As illustrated in FIG. 8, whilst the cutting unit 4 is performing its cutting action at the first axial portion A1, the heating unit 3 is re-synchronised with the new area, that is to say, the second axial portion A2, to be heated for the next cut.

During this situation, the two steps for cutting the first axial portion A1 and for heating the second axial portion A2 are performed simultaneously.

After completing the cutting step at the first portion A1, a first piece 14 of the pipe having predetermined first length L1 is formed starting from the continuous pipe 2.

Figure 9:
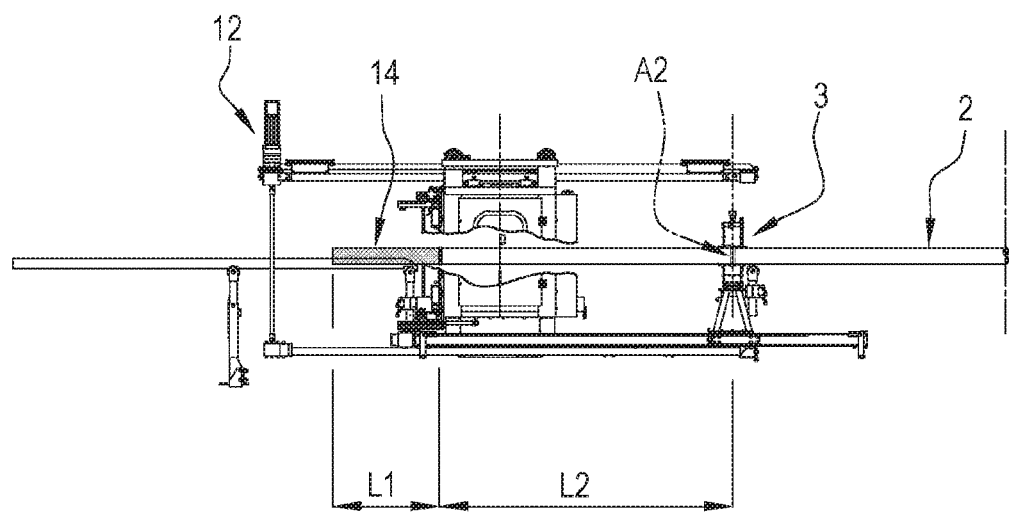

As shown in FIG. 9, after completing the cutting process at the first axial portion A1 and generated to all intents and purposes a first piece 14 of pipe cut with length L1, the heating unit 3 is continuing the step of heating the second axial portion A2 and the cutting unit 4 has reversed its motion and is moving towards its position "0" or in any case towards the condition of minimum distance from the heating unit 3 if this has, in its motion integral with the pipe 2, exceeded the position of "0" of the cutting unit 4.

Figure 10:
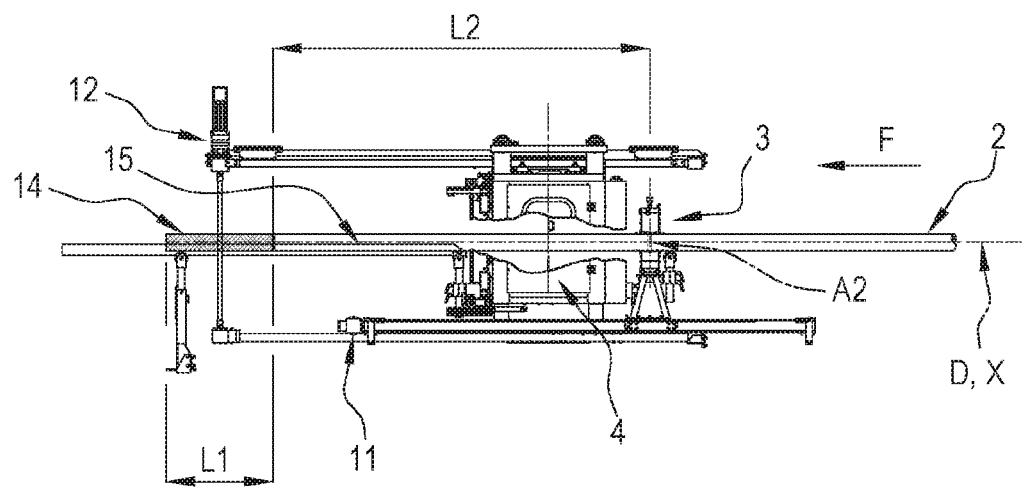

As illustrated in FIG. 10, the cutting unit 4 and the heating unit 3 move again as one with the pipe 2 in the direction of the arrow F, whilst the heating unit 3 is heating the area of the next cut, that is to say, the second axial portion A2. Purely by way of an example, the distance between the first axial portion A1 and the second axial portion A2 is shown with length L2 greater than L1 and, consequently, the second piece of pipe in preparation will have a length L2 greater than L1 of the first piece 14.

Subsequently, not illustrated, the steps already illustrated in FIGS. 6 to 10 and respectively described are repeated.

The method and the apparatus according to the invention achieve the preset aims and have important advantages.

A first advantage connected to the invention is that of appreciably reducing the cycle time necessary for the cutting of pieces of pipe. In effect, thanks to the possibility of moving independently of each other the two heating and cutting units it is possible to perform the heating of an axial portion of the pipe at least partly simultaneously with the cutting of the portion previously heated.

A further advantage is given by the possibility of cutting pieces even with a length less than the minimum distance between the two units, which is impossible with the prior art apparatuses.

Yet another advantage linked to the invention is the reduction in the overall size of the cutting apparatus. In effect, with the prior art cutting apparatuses, since the cutting and heating units are rigidly connected to one another, the stroke (along the direction D) of the shared carriage used for the heating of the axial portion must be added to the stroke used for the cutting to define the total stroke and the consequent overall size of the apparatus.

However, thanks to the method and the apparatus according to the invention, the strokes of the heating unit and the cutting unit are not added together but are partly superposed, thereby reducing the overall size of the apparatus in the feed direction of the pipe.

The invention claimed is:

1. An apparatus for cutting a pipe being advanced through the apparatus, the pipe being made from thermoplastic material, comprising:
   a heating device including a heating element configured for circumferentially heating localized axial portions of the pipe at a predetermined operating temperature;
   a cutting device including a blade configured for cutting the heated localized axial portions of the pipe,
   a first carriage and a second carriage, both axially movable along an axial direction parallel to an axial extension of the pipe;
   wherein the heating device is attached to the first carriage to be movable with the first carriage, and the cutting device is attached to the second carriage to be movable with the second carriage;
   wherein the first carriage and the second carriage are independently axially movable relative to each other, as well as to a speed of advancement of the pipe;
   first and second actuators operatively connected with the first and second carriages respectively for moving the first and second carriages;
   an electronic command and control unit configured for independently controlling the first and second actuators, to independently move the first and second carriages along the axial direction, to allow the heating device and the cutting device to operate simultaneously on two separate localized axial portions of the pipe;
   the electronic command and control unit configured to control the cutting device, the heating device, and the first and second actuators to independently move the first and second carriages, as follows:
      to move the first carriage and heating device closer toward the second carriage and heating device forward along the axial direction;
      to move the second carriage and cutting device forward along the axial direction;
      to space apart the second carriage and cutting device from the first carriage and heating device along the axial direction;
      to move the first carriage and heating device rearward along the axial direction;
      to move the second carriage and cutting device rearward along the axial direction.

2. The apparatus according to claim 1, and further comprising first and second tracks on which the first and second carriages are respectively slidably mounted for movement along the first and second tracks, respectively.

3. The apparatus according to claim 2, wherein the first tracks are separate from the second tracks.

4. The apparatus according to claim 2, wherein the heating device and the cutting device are configured to move relative to each other along the axial direction at a same time as the pipe is fed along the axial direction.

5. The apparatus according to claim 2, wherein each of the respective first and second actuators is configured to be driven independently from the other of the respective first and second actuators.

6. The apparatus according to claim 1, and further comprising:
   wherein the electronic command and control unit is configured to cause the following:
      to accelerate forward along the axial direction the first carriage and heating device to synchronize speed with a first axial portion of the pipe, and then moving synchronously with the first axial portion of the pipe;
      to heat the first axial portion of the pipe while the heating device is moving synchronously with the first axial portion of the pipe;
      to accelerate forward along the axial direction the second carriage and cutting device to synchronize speed with the first axial portion of the pipe, and then moving synchronously with the first axial portion of the pipe;
      to reverse direction of the first carriage and heating unit with respect to the pipe to move rearward along the axial direction with respect to the pipe;
      to again accelerate forward along the axial direction the first carriage and heating device to synchronize speed with a second axial portion of the pipe upstream of the first axial portion of the pipe, and then moving synchronously with the second axial portion of the pipe;
      to heat the second axial portion of the pipe while the heating device is moving synchronously with the second axial portion of the pipe;
      to reverse direction of the first carriage and heating unit to move rearward along the axial direction;
      to synchronize the position of the second carriage and cutting device with the second axial portion of the pipe and cutting the pipe at the second axial portion of the pipe.

7. The apparatus according to claim 6, wherein the heating of the second axial portion and the cutting of the first axial portion are performed simultaneously.

8. The apparatus according to claim 6, wherein the reversing direction of the first carriage and heating unit with respect to the pipe to move rearward along the axial direction with respect to the pipe is started substantially prior to the accelerating forward along the axial direction the second carriage and cutting device to synchronize speed with the first axial portion of the pipe.

9. The apparatus according to claim 1, and further comprising:
   wherein the electronic command and control unit is configured to cause the following:
      to move along the axial direction the first carriage and heating device to synchronize speed with a first axial portion of the pipe, and then moving synchronously with the first axial portion of the pipe;
      to heat the first axial portion of the pipe while the heating device is moving synchronously with the first axial portion of the pipe;
      to move along the axial direction the second carriage and cutting device to synchronize speed with the first axial portion of the pipe, and then moving synchronously with the first axial portion of the pipe;
      to move the first carriage and heating unit rearward along the axial direction with respect to the pipe;
      to move along the axial direction the first carriage and heating device to synchronize speed with a second axial portion of the pipe upstream of the first axial portion of the pipe, and then moving synchronously with the second axial portion of the pipe;
      to heat the second axial portion of the pipe while the heating device is moving synchronously with the second axial portion of the pipe;
      to reverse direction of the first carriage and heating unit to move rearward along the axial direction;

to synchronize the position of the second carriage and cutting device with the second axial portion of the pipe and cutting the pipe at the second axial portion of the pipe.

10. The apparatus according to claim 6, wherein the heating of the second axial portion and the cutting of the first axial portion are performed simultaneously.

11. The apparatus according to claim 9, wherein the moving the first carriage and heating unit rearward along the axial direction with respect to the pipe is started substantially prior to the moving along the axial direction the second carriage and cutting device to synchronize speed with the first axial portion of the pipe.

\* \* \* \* \*